Figure 1:
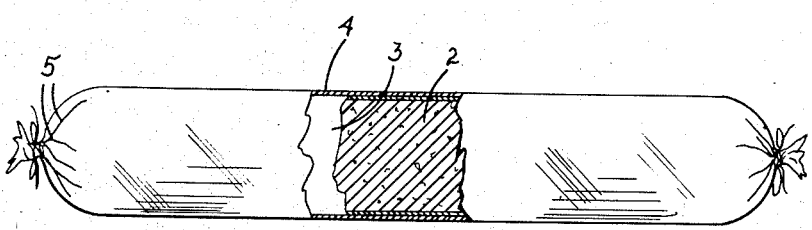

Aug. 17, 1954     W. G. GRANTHAM     2,686,726
STUFFED PRODUCTS COMPRISING A CELLULOSIC CASING
Filed May 6, 1952

INVENTOR.
WILLIAM G. GRANTHAM
BY
ATTORNEY.

Patented Aug. 17, 1954

2,686,726

UNITED STATES PATENT OFFICE 2,686,726

STUFFED PRODUCTS COMPRISING A CELLULOSIC CASING

William G. Grantham, Wilmington, Del., assignor to American Viscose Corporation, Philadelphia, Pa., a corporation of Delaware Application May 6, 1952, Serial No. 286,342

21 Claims. (Cl. 99—176)

This invention relates to stuffed products comprising a moisture-containing material and an artificial casing of a hydrophilic cellulosic material therefor, the outer surface of said casing being provided with an overall thin, non-tacky firmly adherent film or coating of a water-insoluble polymeric material which inhibits the transmission of moisture from the stuffing through the cellulosic casing under the conditions to which such products are normally exposed after their manufacture and prior to use and hence inhibits dehydration of the stuffing.

It is known to stuff sausage meat and other comestibles into an artificial casing formed from a hydrophilic cellulosic material. At the time the meat is stuffed into the casing it contains a certain amount of moisture and it is desirable for the stuffing to retain some of that moisture until the product is used in order to maintain the meat in a fresh, moist condition and to prevent shrinking of the meat and loss of weight of the product.

Although the artificial casings comprising non-fibrous hydrophilic cellulosic materials enjoy wide commercial acceptance they are open to the serious objection for certain comestibles that, having a high moisture-transmission value and being readily permeated by moisture, they permit an excessive amount of moisture to escape from the stuffing under the conditions to which the products are normally exposed between the time of their manufacture and sale thereof to the consumer. The loss in moisture content of the stuffed product is progressive and results in eventual drying out of the stuffing. Depending on the time between manufacture of the product and sale thereof to the consumer, the stuffing may shrivel to the extent that the product becomes unsalable. For example, it has been established that sausage meat encased in a casing of cellulose hydrate obtained by the denitration of cellulose nitrate and having a thickness of 0.0001 inch to 0.003 inch and a total surface area of 311 square centimeters, suffers a loss in weight of 11.0 to 12.7 gms. during each twenty-four hour period it is held at 58% relative humidity and 75° F. The meat product encased in the denitrated cellulose nitrate casing lost a total of 44 gms. in weight when it was exposed to the stated humidity and temperature conditions for four days. This excessive dehydration and reduction in weight of the stuffed products represents a substantial loss to the retail purveyor who buys and pays for the initial wholesale weight and must then resell the products at their reduced weight.

The moisture permeability of hydrophilic cellulosic pellicles is a recognized characteristic and in some other applications of those pellicles as wrapping materials it is common practice to provide the pellicle with a coating formulated to prevent permeation of moisture into the wrapped article when it is exposed to moisture. Up to the present time, however, the hydrophilic cellulosic casings for sausage have not been treated to permit a controlled dehydration of the meat consistent with preservation of the meat while preventing drying out thereof.

The conditioning of non-fibrous hydrophilic cellulosic casings for sausage entails special considerations. While it is essential to reduce the rate of moisture loss by the meat, complete prevention of the escape of moisture from the stuffing is not desirable since if some moisture cannot escape through the casing water accumulates between the stuffing and the inner wall of the casing and acts to soften the meat which then acquires a slimy surface. The accumulated water also induces distortion and unesthetic bulging of the casing. The problem of protecting the stuffed food product, therefore, is one of inhibiting and controlling the rate at which moisture escapes from the stuffing while permitting a limited dehydration such that water does not accumulate under the casing. The rate of escape of moisture from the stuffing must be balanced with retention of moisture by the stuffing so that the accumulation of water under the casing is avoided and the fresh, moist condition of the meat and close fit of the casing are preserved. A further requirement is that the controlled dehydration must be uniform at all portions of the product to avoid localized drying out and shrinking of the meat. This latter requirement in turn requires that the controlled, gradual escape of moisture from the stuffing be uniform at all portions of the product.

In accordance with the present invention it is found that a wholly satisfactory protection is one that permits a controlled, gradual dehydration of the stuffing at 58% relative humidity and 75° F.

The object of this invention is to provide improved stuffed products comprising a casing of hydrophilic cellulosic material which meet the foregoing requirements.

In accordance with the invention, it has been found that the rate of dehydration of sausage meat or the like stuffed into a normally hydrophilic cellulosic casing can be controlled by treating the stuffed product after the stuffing operation and as the final step in the manufacture of the stuffed product, i. e., after cooking, curing and drying operations have been performed, and preferably immediately after the drying step, with a quick-drying composition comprising a water-insoluble polymeric material which is non-tacky at temperatures between room temperature and about 100° C. and which in the form of a film has a low but measurable moisture-transmission value whereby the relatively high moisture transmission value of the hydrophilic cellulosic casing is reduced and the escape of moisture from the stuffing is retarded and controlled but not prevented.

The stuffed products are normally made by twisting and tying one end of the casing, stuffing the casing, and then twisting the opposite end of the casing. In twisting the ends, folds are introduced into the casing so that the ends comprise re-entrant portions. The product may be cut into sections, each of which has an end which is twisted and comprises folds or re-entrant portions, the other end being sealed in some other fashion. Or, concurrently with the stuffing step, the casing may be twisted at intervals to provide links between individual stuffed sections, as is customary in the production of weiners. The product will generally comprise at least one twisted end comprising re-entrant portions, i. e., portions which exist in folded or wrinkled condition. Uniform control of the rate of moisture loss by the stuffing requires the presence of the film or coating of the polymeric material at all portions of the casing surface, including re-entrant, that is, folded or wrinkled portions. This necessary condition is not achieved by providing the sheet material from which the casing is formed with a protective film or coating prior to forming the casing. Twisting of the ends of a pre-coated casing tends to cause peeling or sloughing off of the coating at and adjacent the twisted portion, leaving areas of the casing through which moisture can escape from the stuffing at an increased rate as compared to the rate of moisture loss at remaining portions of the casing. For this reason, the present invention contemplates the application of the composition comprising the water-insoluble protective polymeric material to the stuffed product after the ends have been twisted and secured against accidental untwisting, thus providing a stuffed product comprising a hydrophilic cellulosic casing having at least one twisted end and all portions of the outer surface of which, including folded, wrinkled or re-entrant portions, carry a firmly self-adhered film or coating of the polymeric material of low moisture-transmission value.

There are available a number of synthetic polymeric materials which may be used to inhibit and control the rate of dehydration of the stuffed product under normal storage conditions. In general, those polymeric materials or blends of polymeric materials which are self-adhered to the cellulosic casing at temperatures between room temperature and 100° C. and which in the form of a film having a thickness between 0.0028 inch and 0.0047 inch transmit from 0.00073 to .00355 gm. of moisture per square centimeter of the film surface area over a twenty-four hour period at 58% relative humidity and 75° F. may be used. Polymeric materials which in the form of a film of the thickness stated transmit more than 0.00355 gm. of moisture per square centimeter at 58% relative humidity and 75° C., or which do not adhere to the cellulosic casing are not suitable for use for this purpose. Examples of the polymeric materials which meet the present requirements are the artificial rubbers of the "Buna" type, blends of the artificial rubbers with various compatible vinyl or vinylidene resins, and various vinyl and vinylidene resins per se.

In accordance with one preferred embodiment of the invention, the stuffed product may be treated with an aqueous dispersion or emulsion of a synthetic rubber of the "Buna" type. The term "Buna" as used herein is intended to cover the artificial or synthetic rubbers obtained by the polymerization or copolymerization of butadiene and commercially known and available under such names as "Buna S," "Buna N," "Perbunan," "Chemigum," "Ameripol," and "Hycar." These are copolymers of butadienes with acrylonitrile or styrene which are supplied in the form of aqueous dispersions or latices and sold in a number of types usually designated by identifying numerals and letters. The term "Buna" is also intended to include other rubber-like butadiene polymers and copolymers of the "Buna" type such as products obtained by various polymerization methods and steps and products obtained by copolymerizing various proportions of butadiene and styrene or of butadiene and acrylonitrile, as well as ternary copolymers of butadiene, styrene and acrylonitrile, copolymers of butadiene and coumarone or indene and, in general, those artificial or synthetic rubbers which are butadiene polymers or copolymers. The commercially available emulsions or latices may be used alone as they are supplied, or they may be mixed or blended with various modifying materials including wax. Suitable waxes are candellilla, carnauba, paraffin, montan, and commercially available wax preparations such as the mixture of emulsified wax and aluminum salt marketed under the trade-name "Hy-Pel-WR."

The synthetic rubbers are most conveniently employed in their commercially available forms, but may be prepared for use for the present purpose by mixing the butadiene polymer with an aqueous medium comprising an emulsifying agent. Suitable emulsifying agents include sodium lauryl sulfate, sodium dioctyl sulfosuccinate, alkaryl acids, sulfonic acids and their salts, quaternary ammonium, sulfonium, and phosphonium halides, and the like. The emulsion may also contain a plasticizing agent which may be, for example, of the plasticizing resin type, i. e., a "soft" resin such as a polymerized unsaturated hydrocarbon, for instance polymerized isobutylene which is commonly sold under the trade-name "Vistanex," a soft alkyd resin, or an organic plasticizer such as dibutyl sebacate, dibutyl phthalate, dicresyl phosphate, cyclohexylbutyl phthalate, and the like or mixtures of those plasticizers. Protective colloids may also be added to the emulsion of the butadiene polymer. As protective colloids there may be mentioned casein, glue, a water-soluble cellulose ether such as methyl cellulose, or a gum such as arabic, karaya, or tragacanth.

In accordance with another embodiment of the invention, the stuffed product comprising the hydrophilic cellulosic casing may be treated with a poly-disperse system comprising an aqueous dispersion or emulsion of the synthetic rubber particles and separate particles of a compatible vinyl or vinylidene resin. By "vinyl resin" is meant a resin obtained by the polymerization or copolymerization of monomers at least one of which contains the vinyl group, for instance, vinyl chloride, and predominates in the copolymer molecule. By "vinylidene resin" is meant those resins of the type of saran in which the component comprising the vinylidene group predominates in the polymer molecule. The particulate vinyl or vinylidene resin may be added to the synthetic rubber emulsion, or the poly-disperse system may be obtained by mixing or blending the synthetic rubber emulsion with a separately prepared dispersion or emulsion of the vinyl or vinylidene resin. Examples of vinyl resins which may be used are the copolymers of vinyl chloride containing by weight in the polymer molecule from 80% to 95% of vinyl chloride. Particularly suitable are copolymers of 80% to 95% vinyl chloride and 5% to 20% vinylidene chloride. Examples of the vinylidene resins which may be used are those copolymers of vinylidene chloride containing, by weight in the polymer molecule, from 60% to 99% of vinylidene chloride. Very suitable products of this type are the copolymers of vinylidene chloride and maleic acid derivatives such as ethylene maleate in which the vinylidene chloride content is within the range stated.

In those cases where emulsions or dispersions of the vinyl and vinylidene resins are commercially available, the commercial products may be used. Or the emulsions may be prepared by mixing the particulate copolymer with an aqueous medium containing an emulsifying agent. Plasticizing agents, waxes, and other adjuvants may be added, if desired.

Aqueous emulsions of the vinyl and vinylidene resins may also be used without admixture thereof with a synthetic rubber. Examples of such products include aqueous emulsions of polyvinylbutyral which may be produced by reacting polyvinyl alcohol with butyraldehyde, for example polyvinylbutyrals in which from 50 to 85% of the hydroxyls of the polyvinyl alcohol are substituted, i. e., those containing from 31.3% to 45.7% combined butyraldehyde.

Commercially available dispersions or emulsions of the vinyl or vinylidene resins may be used with or without dilution, or the emulsions may be prepared in the usual way and may include plasticizing, pigmenting and/or other adjuvants.

In accordance with still another embodiment of the invention, the stuffed product may be treated with an organic solvent solution of a vinyl or vinylidene resin which meets the requirements as to moisture-transmission value set forth herein. Thus, the product may be treated with a solution of a copolymer of vinylidene chloride and acrylonitrile of the saran type in methyl ethyl ketone, acetone, chloroform, or 1,4-dioxane.

The emulsions or solutions discussed above may be applied to the stuffed products by dipping, spraying, brushing or by any other method which insures overall coating of the hydrophilic cellulosic casing including folded, wrinkled or twisted portions. After application of the emulsion or solution to the casing, the product is held at room temperature or at a temperature up to about 65° C., until the film of the polymeric material is dried. The synthetic rubber, blend or resin solution or dispersion dries quite rapidly at the temperatures indicated and is self-anchored to the cellulosic casing to which it firmly adheres and with which it can be readily stripped from the stuffing prior to its consumption. The film or coating self-adhered to the cellulosic casing preferably has a thickness of .0028 inch to .0047 inch and may result from one or more applications of the aqueous emulsion or organic solvent solution to the stuffed product. The dried film is continuous, transparent and has a high gloss. Unless coloring adjuvants are added to the composition, as they may be, if desired, the protective film is substantially colorless. The emulsion or solution of the polymeric material tends to flow into the folds at the twisted end or ends of the casing and hence the film or coating of the polymeric material on the final product is coextensive with the casing and unbroken at all portions thereof.

Reference is made to the accompanying drawing in which

Figure 2:
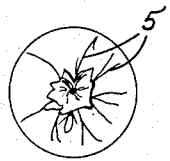

Figure 1 is a front view, partly in section, of a sausage in accordance with the invention; and Figure 2 is an end view of the product shown in Fig. 1.

Referring to the drawing, the stuffing 2 is provided with a casing 3 of non-fibrous hydrophilic cellulosic material having twisted ends and comprising the folds or re-entrant portions 5. The casing has adhered thereto a film 4 of a water-insoluble polymeric material as defined herein. The film 4 occurs at all portions of the casing, including the folds 5, to control the rate of moisture transmitted through the casing substantially uniformly at all areas of the stuffed product.

The stuffed product may be made by any known procedure, and the casing may be an extruded seamless casing or it may be a seamed casing formed concurrently with stuffing thereof from a continuous, thin non-fibrous cellulosic sheet or film the edges of which are overlapped and bonded together by depositing a solvent for the sheet material on one edge, overlapping the edges, and subjecting the overlapped edges to pressure, or by depositing a sealing material, such as a thermoplastic material which may be in the form of a solution, a strip or a thread, or in molten condition, between the edges, overlapping the edges and then subjecting the overlapped edges having the sealing material disposed therebetween to heat and pressure or to cooling and pressure as may be required.

The hydrophilic cellulosic casing may comprise a non-fibrous pellicle made from viscose, cuprammonium cellulose solutions or solutions of cellulose in organic or inorganic solvents, denitrated cellulose nitrate, a cellulose ether which is insoluble in water including water-insoluble, alkali soluble hydroxyalkyl cellulose or carboxyalkyl cellulose, mixed ethers of that class, cellulose ether xanthates, cellulose thiourethanes and cellulose xantho fatty acids. The pellicle may contain a suitable plasticizer.

The following examples in which the parts given are by weight unless otherwise specified illustrate specific embodiments of the invention. Although, in the examples, the invention is illustrated in connection with the special meat product comprising a casing of cellulose hydrate obtained by the denitration of cellulose nitrate it will be understood that the invention may be practiced in connection with other meat products and similar foodstuffs having a casing formed from any of the hydrophilic cellulosic film-forming materials mentioned hereinabove or their equivalents.

*Example 1*

A product made by stuffing sausage meat into a casing of cellulose hydrate obtained by denitrating cellulose nitrate and having a thickness of about .0022 inch and twisting the ends of the casing was dipped into a 20% solution of a copolymer of 85% vinylidene chloride and 15% acrylonitrile (or the product marketed commercially as Saran F–120) in methyl ethyl ketone, at room temperature, withdrawn, dried in air at about 60° C., redipped in the solution, and again dried in air at about 60° C. The product was allowed to hang in the air at room temperature for about twelve hours. It comprised a dried, continuous film of the vinylidene chloride-acrylonitrile copolymer which was glossy, non-tacky, substantially colorless, and had a thickness in the range given hereinabove. The film was firmly self-adhered to the cellulosic casing, and strippable from the stuffing with the casing without tearing. The product comprising the film weighed 356.5 gms. and the copolymer film had a total surface area of 323 sq. cms. The product was hung in a constant humidity room at 58% relative humidity and 75° F., together with a control which had not been treated with the vinylidene chloride-acrylonitrile copolymer. The control weighed 334.0 gms., and its cellulosic casing had a total surface area of 311 sq. cms. After 96 hours the treated product and the control were removed from the constant humidity room and weighed. The product carrying the copolymer film weighed 356.0 gms., i. e., it had undergone a total weight loss of 0.5 gm. or 0.125 gm. per twenty-four hour period of storage, equal to a moisture transmission value of 0.00073 gm./sq. cm. for the casing having the copolymer film adhered thereto. The control weighed 290.0 gms. It had lost a total of 44 gms., or an average of 11.0 gms. per twenty-four hour storage period, equal to a moisture transmission value for the cellulosic casing of 0.0501 gm./sq. cm.

*Example 2*

A sausage as in Example 1 was treated by the procedure of Example 1 with a blend comprising 50 parts of the synthetic rubber emulsion available commercially as "Chemigum 235 CHS" (an aqueous emulsion of a copolymer of 55 parts butadiene and 45 parts of acrylonitrile) and 50 parts of the emulsion available commercially as "Pliovic Latex 300" (an aqueous emulsion of a copolymer of vinylidene chloride and ethylene maleate) having a total solids content of 40%, to provide the casing with a continuous film having a thickness as set forth herein. After 96 hours at 58% relative humidity and 75° F., the treated sausage was found to have lost a total of 3.4 gms. in weight, or an average of 1.1 gms. per twenty-four hour storage period. The moisture transmission value for the casing having the copolymer film adhered thereto was 0.00335 gm./sq. cm.

*Example 3*

A sausage as in Example 1 was treated by the procedure of Example 1 with the synthetic rubber emulsion available commercially as "Chemigum 245 A" (an aqueous emulsion of a copolymer of 67% butadiene and 33% acrylonitrile) having a total solids content of 40%, whereby the casing was provided with a protective film of a thickness as set forth herein. The product was hung with a control in the constant humidity room and after 96 hours it was found to have lost a total of 4.9 gms. in weight or an average of 1.2 gms. per twenty-four hour storage period. The casing having the copolymer film adhered to it transmitted 0.00263 gm. of moisture per sq. cm. The untreated sausage had lost a total of 38.0 gms. in weight or an average of 12.7 gms. per twenty-four hour storage period.

*Example 4*

A sausage as in Example 1 was treated by the method of Example 1 with a blend comprising 50 parts of "Chemigum 235 CHS" and 50 parts of the emulsion available commercially as "Latex 744-Dow" (an aqueous emulsion of a copolymer of 85% vinyl chloride and 15% vinylidene chloride), the blend having a total solids content of 40%. The casing of the treated product was thus provided with a film of the desired thickness as given above. On removal of the treated sausage from the constant humidity room after 96 hours it was found to have lost a total of 4.0 gms. in weight, equal to an average loss of 1.3 gms. per twenty-four hour storage period. The moisture transmission value for the protective film adhered to the cellulosic casing was 0.00232 gm./sq. cm. Here, as in the other examples given herein, the moisture transmission value stated is the amount of moisture transmitted while the product was stored at 58% relative humidity and 75° F.

Various modifications may be made in practicing the invention, both in the composition of the polymeric material and in the proportions of the respective components of the blends or mixtures. For instance, in Examples 2 and 4, the blends of the emulsions illustrated may comprise from 25 to 75 parts of one component to from 75 to 25 parts of the other. Also, the concentration of the copolymer in the solution of Example 1 may be varied between 5 and 35%. Furthermore, although the emulsions illustrated had a solids content of 40%, a lower solids content down to 5% may be used and may be obtained by suitable dilution of the commercial emulsions which dilution may be effected without separation of the emulsions into distinct phases.

The small amount of moisture lost by the stuffed products during storage, which approximated the conditions to which sausage and the like is normally exposed, was sufficient to prevent the accumulation of water under the treated casing but not sufficient to effect excessive drying out or noticeable shrinkage of the meat. The cellulosic casings adapt themselves to shrinkage and expansion of the meat during cooking and drying operations incidental to the production of the stuffed products and, therefore, immediately after manufacture of the products the casing conforms very closely to the meat without actually adhering to it. No accumulation of water under the casing of the stuffed products of this invention was noticeable over a prolonged storage time.

The stuffed product comprising the hydrophilic cellulosic casing having the protective non-tacky polymeric film or coating firmly self-adhered to its outer surface may be a meat product from which the casing is removed before the meat is consumed, i. e., cold meats of the type of salami, bologna, liverwurst, etc. or it may be a product comprising linked frankfurters which is treated before the links are broken, the frankfurters being of the type from which the casing is removed to obtain so-called "skinless" frankfurters. Other stuffed products, particularly food products having a hydrophilic cellulosic casing and which are subject to deterioration by dehydration may also be treated in accordance with the invention.

As has been indicated, the stuffed products with which the invention is particularly concerned are produced by twisting and tying one end of the cellulosic casing, stuffing the casing, twisting and tying the other end of the casing, and then cooking, curing and drying the product. The treatment with the quick-drying composition comprising the protective polymeric material will generally be performed as the final step in the manufacture, immediately after drying of the cooked product, and therefore the invention also contemplates the steps, carried out in sequence, of stuffing the casing, cooking and, optionally, curing the encased meat, drying the product and then treating it with the composition comprising the polymeric material. This not only insures the presence of the polymeric material at all portions of the casing but also permits of cooking the meat while the casing is in the untreated strongly hydrophilic condition.

Modifications may be made in practicing the invention without departing from the spirit and scope thereof and it is to be understood that the invention is not to be limited except as defined in the appended claims.

I claim:

1. A stuffed, moisture-containing food product comprising a thin casing of a non-fibrous hydrophilic cellulosic material, all portions of the outer surface of the casing including any folded and wrinkled portions thereof having firmly self-adhered thereto a non-tacky film comprising a water-insoluble, polymeric material which, in the form of a film having a thickness of 0.0028 inch to 0.0047 inch, transmits from 0.00073 to 0.00355 gm. of moisture per square centimeter of the surface area of the film over a twenty-four hour period at 58% relative humidity and 75° F.

2. Sausage comprising a casing of non-fibrous hydrophilic cellulosic material having at least one twisted end, all portions of the outer surface of the casing including the twisted portion carrying a firmly self-adhered, non-tacky film comprising a water-insoluble polymeric material which is in the form of a film having a thickness between 0.0028 inch and 0.0047 inch and transmits from 0.00073 to 0.00355 gm. of moisture per square centimeter of the surface area of the film over a twenty-four hour period at 58% relative humidity and 75° F.

3. Sausage in accordance with claim 2 characterized in that the casing of non-fibrous hydrophilic cellulosic material has firmly self-adhered thereto a non-tacky film of a polymerized butadiene synthetic rubber.

4. Sausage in accordance with claim 2 characterized in that the casing of non-fibrous hydrophilic cellulosic material has firmly self-adhered thereto a non-tacky film of a copolymer of vinylidene chloride and acrylonitrile.

5. Sausage in accordance with claim 2 characterized in that the non-fibrous hydrophilic cellulosic casing has firmly self-adhered thereto a non-tacky film comprising a mixture of a polymerized butadiene synthetic rubber and a wax.

6. Sausage in accordance with claim 2 characterized in that the non-fibrous hydrophilic cellulosic casing has firmly self-adhered thereto a non-tacky film comprising a blend of a polymerized butadiene synthetic rubber and a compatible vinylidene resin.

7. Sausage in accordance with claim 2 characterized in that the non-fibrous hydrophilic cellulosic casing has firmly self-adhered thereto a non-tacky film comprising a blend of a polymerized butadiene synthetic rubber and a compatible vinyl resin.

8. Sausage in accordance with claim 2 characterized in that the non-fibrous hydrophilic cellulosic casing has firmly self-adhered thereto a non-tacky film comprising a blend of a polymerized butadiene synthetic rubber and a copolymer of vinylidene chloride and ethylene maleate.

9. Sausage in accordance with claim 2 characterized in that the non-fibrous hydrophilic cellulosic casing has firmly self-adhered thereto a non-tacky film comprising a blend of a polymerized butadiene synthetic rubber and a copolymer of vinyl chloride and vinylidene chloride.

10. Sausage in accordance with claim 2 characterized in that the non-fibrous hydrophilic cellulosic casing has firmly self-adhered thereto a non-tacky film of a polyvinylbutyral.

11. Sausage in accordance with claim 2 characterized in that the non-fibrous hydrophilic cellulosic casing has firmly self-adhered thereto a non-tacky film comprising a mixture of a polyvinylbutyral and a wax.

12. The method of producing sausage which comprises the steps of stuffing a casing of a non-fibrous hydrophilic cellulosic material with meat to obtain a stuffed product the casing of which has at least one twisted end, cooking and curing the encased meat while the casing is in the hydrophilic condition, drying the stuffed product, treating all portions of the outer surface of the casing of the stuffed product with a liquid medium containing a water-insoluble polymeric material which, in the form of a dried film having a thickness between 0.0028 inch and 0.0047 inch transmits from 0.00073 to 0.00355 gm. of moisture per square centimeter of the surface area of the film over a twenty-four hour period at 58% relative humidity and 75° F., and drying the treated product at a temperature between room temperature and 100° C. to form a film on the casing which reduces the moisture transmission rate through the casing.

13. The method of claim 12 in which the liquid medium comprises an aqueous emulsion of a polymerized butadiene synthetic rubber.

14. The method of claim 12 in which the liquid medium comprises an aqueous emulsion of a blend of a polymerized butadiene synthetic rubber and a wax.

15. The method of claim 12 in which the liquid medium comprises an aqueous emulsion of a blend of a polymerized butadiene synthetic rubber and a compatible vinyl resin.

16. The method of claim 12 in which the liquid medium comprises an aqueous emulsion of a blend of a polymerized butadiene synthetic rubber and a copolymer of vinyl chloride and vinylidene chloride containing, by weight in the copolymer molecule, a preponderant proportion of the vinyl chloride.

17. The method of claim 12 in which the liquid medium comprises an aqueous emulsion of a blend of a polymerized butadiene synthetic rubber and a compatible vinylidene resin.

18. The method of claim 12 in which the liquid medium comprises an aqueous emulsion of a blend of a polymerized butadiene synthetic rubber and a copolymer of vinylidene chloride and ethylene maleate.

19. The method of claim 12 in which the liquid medium comprises an aqueous emulsion of a polyvinylbutyral.

20. The method of claim 12 in which the liquid medium comprises an organic solvent solution of a copolymer of vinylidene chloride and vinyl chloride containing, by weight in the copolymer molecule, a preponderant proportion of the vinylidene chloride.

21. A stuffed, moisture-containing food product comprising a thin casing of a non-fibrous hydrophilic cellulosic material, all portions of the outer surface of the casing including any folded and wrinkled portions thereof having firmly self-adhered thereto a non-tacky film comprising a water-insoluble, polymeric material selected from the group consisting of butadiene polymers and copolymers, copolymers of vinyl chloride containing 80 to 95% by weight of vinyl chloride, copolymers of vinylidene chloride contains 60 to 99% by weight of vinylidene chloride, polyvinyl butyrals, and mixtures thereof, said film having a thickness between 0.0028 inch and 0.0047 inch and having a moisture transmission rate of 0.00073 to 0.00355 grams per square centimeter of the surface area of the film over a twenty-four hour period at 58% relative humidity and 75° F.

References Cited in the file of this patent

UNITED STATES PATENTS

| Number | Name | Date |
|---|---|---|
| 2,337,666 | Koonz et al. | Dec. 28, 1943 |
| 2,374,767 | Mitchell et al. | May 1, 1945 |
| 2,431,001 | Sullivan | Nov. 18, 1947 |
| 2,462,185 | Hauser | Feb. 22, 1949 |
| 2,496,976 | Barney | Feb. 7, 1950 |
| 2,597,625 | Drisch et al. | May 20, 1952 |
| 2,607,696 | Kunz | Aug. 19, 1952 |
| 2,607,710 | Schmelzle et al. | Aug. 19, 1952 |